United States Patent [19]

Ringo

[11] Patent Number: 4,848,731
[45] Date of Patent: Jul. 18, 1989

[54] TIRE CASING SPREADER

[76] Inventor: Arthur Ringo, 7246 South Eberhart, Chicago, Ill. 60619

[21] Appl. No.: 190,996

[22] Filed: May 6, 1988

[51] Int. Cl.⁴ ............................................. B60C 25/14
[52] U.S. Cl. .................................. 254/50.1; 254/50.2; 254/50.4
[58] Field of Search .................... 254/50.1, 50.2, 50.3, 254/50.4, 248; 81/153

[56] References Cited

U.S. PATENT DOCUMENTS

| | | | |
|---|---|---|---|
| 1,288,733 | 12/1918 | Stevens | 254/50.3 |
| 2,496,389 | 2/1950 | Goodman | 254/50.4 |
| 2,650,062 | 8/1953 | Anderson | 254/50.1 |
| 3,000,615 | 9/1961 | Alm | 254/50.3 |
| 3,002,223 | 10/1961 | Rawls | 254/50.3 |
| 3,097,825 | 7/1963 | Ruhland | 254/50.3 |

Primary Examiner—Frederick R. Schmidt
Assistant Examiner—Judy J. Hartman
Attorney, Agent, or Firm—Burmeister, York, Palmatier, Hamby & Jones

[57] ABSTRACT

A device for holding and supporting a tire casing during servicing, and for spreading the casing of a tire so that the inner tube may be removed. The device includes a stackable cylindrical base having diametrically opposite cut-outs to accommodate a tire casing, a platform extending between the cut-outs to support the casing, and two hooks pivotally mounted on the cylindrical base diametrically opposite each other to engage and spread the tire casing. A pivotally mounted lever arm displaces one of the hooks from an engaged position to a non-engaged position.

11 Claims, 1 Drawing Sheet

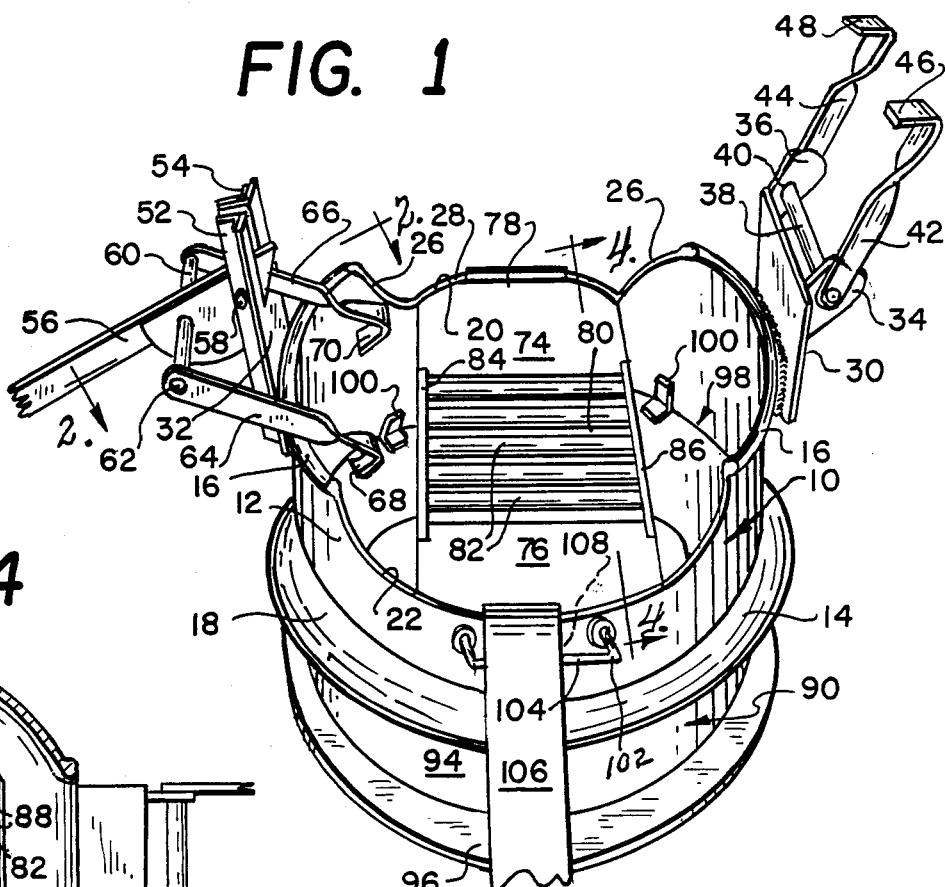
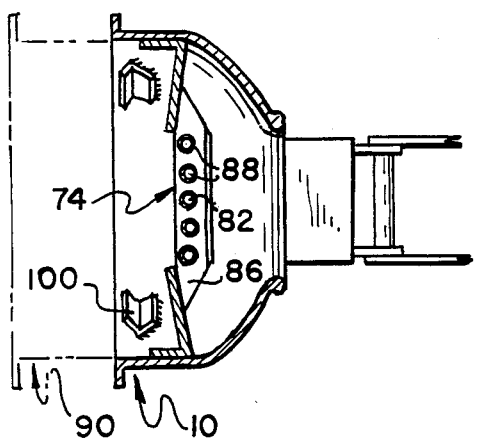
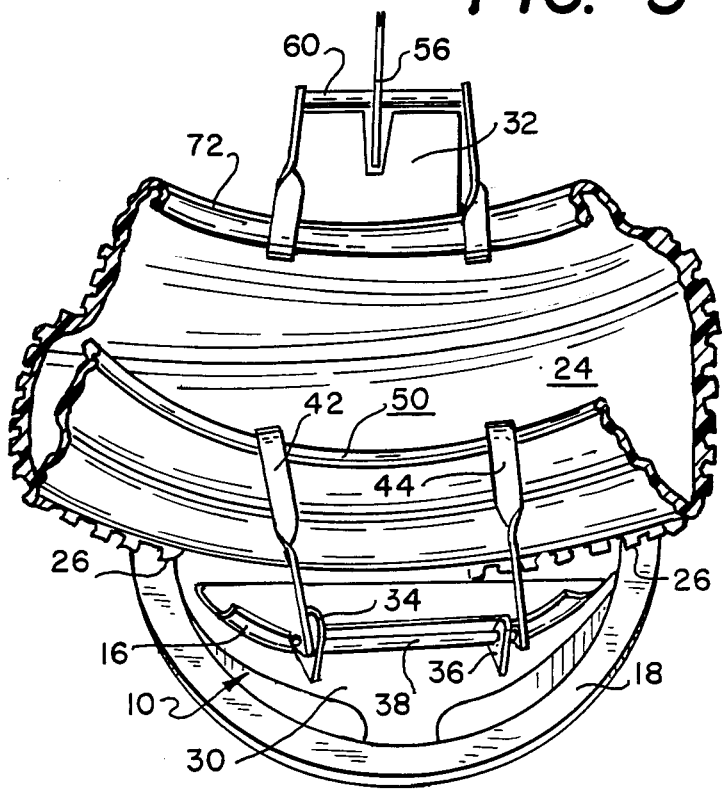
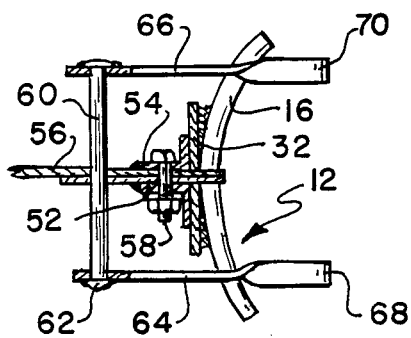

TIRE CASING SPREADER

The present invention relates to devices for spreading the casing of a tire so that an inner tube can be removed or the casing may be repaired. The present invention also relates to devices for holding and supporting a tire casing for servicing the casing.

BACKGROUND OF THE INVENTION

Modern tire servicing stations are equipped with pneumatic tire repair equipment for removing the rim of the tire from the casing, spreading the casing, and otherwise facilitating the repair of the tire. However, there are only rudimentary tools available to most mechanics to repair tires on the road.

Many trucks continue to use tube tires, and such tires are heavy and relatively expensive. Often trucks are operated over rough terrain and in off-road service resulting in a higher than normal incidence of unpredicted flat tires. It is often desirable to service such vehicles where the flat occurred rather than changing the tire and repairing it in a service station. Occasionally a replacement tire is not readily available, or the breakdown occurs in an area that does not readily provide communication, thus making on site repair the only practical solution.

There have been tools for working tires which spread casings in the past, but such devices were not particularly suitable for repairing heavy truck tires on location. U.S. Pat. No. 1,698,883 to M. Henderson entitled Tire Working Tool discloses a device designed to be supported and mounted on a bulkhead which includes a foot actuated pedal for spreading a tire casing. U.S. Pat. Nos. 2,364,242 to W. G. Prentice and 2,732,174 to S. E. Kossman disclose tire spreading devices with massive or bulky structures totally unsuitable for use on location or in most small shops. U.S. Pat. Nos. 1,866,518 to J. L. Peshette, 1,959,431 to C. W. King, and 1,990,611 to H. J. Mutchler disclose tire spreading devices which provide little support for the tire casing and would be awkward to repair a heavy truck tire. U.S. Pat. No. 2,496,389 to B. Goodman provides a wheel supported carriage with hydraulic jacks for spreading a tire casing which is not designed for use on location.

It is an object of the present invention to provide a tire spreader which is readily portable and still provides a stand upon which the tire casing is positioned for easy access.

In addition, it is an object of the invention that the tire spreader avoid the use of pumps, jacks, latches and the like which complicate the usefulness of such devices, decrease the reliability of such devices and increase the cost thereof.

Further, it is an object of this invention to provide a rugged tire casing spreader capable of use in repairing truck tires at a modest cost.

THE INVENTION

The inventor has found that a tire spreading device utilizing a modified tire rim for a base is particularly useful device for changing tires on location. Trucks are other provided with devices for carrying tire rims, or may be readily provided with such means. Further, tire rims have cylindrical walls which are provided with outwardly extending flanges at one end, and the flange of one tire rim will accommodate the other end of a second identical tire rim, thereby making it possible to stack two rims to raise the tire spreading device to a convenient operating level. The tire spreading device can be utilized, however, without the second tire rim by positioning it directly on a generally horizontal supporting surface, such as the ground.

The end of the cylindrical wall of the tire spreading device opposite the annular flange is provided with cut-outs on opposite sides of the central axis of the wall and the cut-outs extend into the wall to provide a region for accommodating a tire casing, the edges of the cut-outs supporting the casing when in spread condition. The casing is engaged by cleats or hooks disposed at the ends of arms which are adapted to engage the bead of the tire casing, and the arms are pivotally mounted at their ends opposite the hooks on axis mounted on the cylindrical wall, one axis being disposed between the cut-outs on one side of the wall and the other axis being disposed on the opposite side of the casing. A pair of arms and hooks are used with each axis to provide stability to the mounted and engaged tire casing.

One of the pivotal axes comprises a shaft mounted on a lever arm which is itself pivotally mounted on the cylindrical wall adjacent to one end thereof. The shaft is mounted parallel to and at a distance from the pivotal axis of the lever arm, thereby providing a locked or rest position in which the load of the casing works against release of the casing.

The tire casing spreader is provided with a platform that extends across the cylindrical wall between the cut-outs to support the tire casing on the base. In addition, a removable ramp is provided to facilitate rolling a heavy tire casing onto the platform of the base.

DESCRIPTION OF DRAWINGS

For a more complete understanding of the present invention, references made to the drawings, in which:

FIG. 1 is an isometric view of a tire casing spreader constructed according to the teachings of the present invention;

FIG. 2 is a sectional view taken along the line 2—2 of FIG. 1;

FIG. 3 is a fragmentary isometric view illustrating the tire casing spreader engaging a tire casing; and FIG. 4 is a sectional view taken along the line 4—4 of FIG. 1.

PREFERRED CONSTRUCTION OF THE INVENTION

As illustrated in FIGS. 1 and 3, the tire casing spreader has a base 10 which is provided with a hollow cylindrical wall 12. The base 10 extends between ends 14 and 16, and is provided with an outwardly extending circumferential flange 18 at the end 14.

The casing 10 has cut-outs 20 and 22 which extend inwardly from the end 16 on opposite sides of the central axis of the wall 12. The cut-outs are adapted to accommodate the tire casing, illustrated at 24 in FIG. 3. It will be noted that the cut-outs have tapered edges 26 and a flat portion 28 which connects the edges 26. The flat portion 28 and the outwardly tapering edges 26 of each of the cut-outs provides sufficient space for the tire casing 24 to be spread within the structure of the wall 12.

A first plate 30 is mounted on the wall 12 centrally between the cut-outs 20 and 22 and extends outwardly from the edge 16. A second plate 32 is also mounted on the outer surface of the wall 12 centrally between the cut-outs on the opposite side of the central axis of the wall from the plate 32. The first plate has a pair of spaced tabs 34 and 36 which extend outwardly from the plate 30, and a shaft 38 is journaled in openings 40 in the tabs 34 and 36. A pair of arms 42 and 44 are secured to opposite ends of the shaft 38 and are rotatable therewith, and the arms 42 and 44 are provided with depending cleats 46 and 48 at the ends thereof, respectively. The cleats 46 and 48 extend downwardly of the arms 42 and 44 when the arms are disposed inward of the wall 10 to grip the bead 50 of the casing 24.

The plate 32 is provided with a pair of outwardly extending flanges 52 and 54 which are disposed parallel to the axis of the wall 12. The flanges 52 and 54 are parallel and spaced from each other, and a lever arm 56 has one end disposed between the flanges 52 and 54, that end being journaled on a pin 58. The lever arm 56 carries a sleeve 60 which is secured thereto, as by welding, parallel to the pin 58 and spaced from the pin 58. The sleeve accommodates and journals a rod 62 which extends outwardly from opposite ends of the sleeve 60, and the rod 62 is secured at its ends on arms 64 and 66. The arms 64 and 66 are provided with cleats 68 and 70 at their ends opposite the rod 62. The cleats extend downwardly when disposed within the wall 12 and are adapted to engage one of the beads 72 of the tire casing 24.

A platform 74 extends from the cut-out 20 to the cut-out 22. The platform 74 has end portions 76 and 78 which extend downwardly from the cut-outs 20 and 22, and a central portion 80. The central portion 80 is generally flat and parallel to the planes of the ends 14 and 16, and the central portion 80 is also provided with a plurality of parallel rollers 82 which are journaled between edge plates 84 and 86 for rotation. The edge plates 84 and 86 are provided with spaced pegs 88 which are rotatably disposed within the ends of the rollers 82.

It is desirable to have the tire spreader mounted some distance above the ground when spreading a tire on location, and for this purpose, a second base 90 may be placed beneath the base 10. The base 10 is provided with the outwardly extending annular flange 18, and the second base is similar to the first base in that it has a cylindrical wall 94 with a first end 96 adapted to rest upon a horizontal surface and a second flat end 98 adapted to fit within the annular flange 18 and abut the wall 12 of the first base. To prevent the first base from sliding outwardly from the second base, the first base is provided with tabs 100 which may be welded thereon and extend downwardly confronting the annular flange 18 thereof, the tabs 100 engaging the inner surface of the wall 94 of the second base 90.

Tire spreaders constructed according to the present invention are generally intended for use with heavy truck tires, and it may be difficult to lift a heavy truck tire onto the base for spreading. For this reason, the first base 10 is provided with a handle 102 with a flat central portion 104 tangential to the wall 12, and a flat ramp 106 provided with a downwardly depending lip 108 engages the straight portion 104 of the handle 102 and extends outwardly from the cut-out 20 or 22 to the horizontal surface upon which the base 10 or the bases 10 and 90 are disposed. The ramp 106 forms an inclined plane to facilitate rolling of a tire onto the tire spreading device.

As best illustrated in FIG. 3, the tire when rolled upon the tire spreading device is engaged first by the cleats 46 and 48 of the arms 42 and 44, thereby holding the bead 50 securely against movement. Thereafter, the lever arm 56 is raised, thus moving the shaft 62 upwardly and over the upper edge of the first plate 32. The lever arm may be rotated clockwise, as viewed in FIG. 1, to position the lever arm into the interior of the wall 12, such as at the four o'clock position. As a result, the arms 64 and 68 have been translated toward the right and toward the axis of the cylindrical wall 12, and from this position, the cleats 68 and 70 can engage the bead 72 of the tire casing 24. The lever arm is then rotated manually back over the first plate 32 to the position indicated in FIG. 1, thereby moving the shaft 62 through an arc positioning it outwardly of the pin 58 and drawing the arms 64 and 66 outwardly to spread the casing 24. When the lever arm is rotated to position the shaft 62 on a plane downward of the horizontal plane of the pin 58, the force of the casing 24 against the arms 64 and 66 tends to draw the lever arm further downwardly in a counterclockwise direction, thereby preventing release of the casing. The lever arm merely rotates further counterclockwise until the end of the lever arm 56 opposite the plate 32 abuts the surface upon which the tire spreader rests.

Those skilled in the art will devise uses for the present invention beyond those here disclosed. Further, those skilled in the art will devise modifications of the present invention within the intended scope of the invention. It is, therefore, intended that the scope of the invention be not limited by the foregoing specification, but rather only by the appended claims.

The invention claimed is:

1. A tire casing spreader comprising, in combination, a base having a hollow cylindrical wall with a central axis and first and second open ends, the first and second ends being disposed on spaced planes normal to the axis of the wall and the first end being adapted to rest upon a horizontal surface, the wall having first and second cut-outs extending therein from opposite sides of the second end adapted to receive a tire casing, a first means for engaging a bead of a tire casing mounted on the wall adjacent to the second end thereof between the first and second cut-outs, said first means having a first arm pivotally mounted at one end for rotation about a first pivotal axis disposed in a fixed position tangent and adjacent to the wall, said first arm being rotatable between a first position farther from the central axis than the first pivotal axis and a second position between the central axis and the first pivotal axis, said first arm having a first hook extending outwardly therefrom and downwardly therefrom when the arm is disposed in the second pivotal position, said first hook being adapted to engage one of the beads of a tire casing in said second pivotal position, and a second means for engaging a bead of a tire casing mounted on the wall adjacent to the second end thereof on the opposite side of the wall from the first means, said second means having a second arm pivotally mounted at one end for rotation about a second pivotal axis disposed tangent and adjacent to the wall, said second arm being rotatable between a first position farther from the central axis than the second pivotal axis and a second position between the central axis and the second pivotal axis, said second arm having a second hook extending outwardly therefrom and downwardly therefrom when the arm is disposed in the second pivotal position, said second hook being adapted to engage the other bead of a tire casing in said second pivotal position, further including means for displacing said second means for engaging a bead between said first and second positions, and further including a platform having first and second opposite ends, the first end being mounted on the wall adjacent to the first cut-out and the second end being mounted on the wall adjacent to the second cut-out, the cut-outs extending into the wall to a third plane between the planes of the first and second ends and the platform having a central portion adapted to support a tire casing disposed between the third plane and the plane of the first end of the wall.

2. A tire casing spreader comprising the combination of claim 1 wherein a plurality of spaced rollers are rotatably mounted on the central portion of the platform, the rollers protruding from the central portion of the platform toward the third plane.

3. A tire casing spreader comprising the combination of claim 1, in combination with a handle mounted on the side of the wall opposite the central axis adjacent to the first cut-out, said handle having an elongated slot tangential to the wall, and a flat plank having a depending lip slidably engaging the slot in the handle, said plank forming an inclined plane from the plane of the first end of the base to the elongated platform.

4. A tire casing spreader comprising the combination of claim 1 wherein the platform has a first and a second end portion extending at equal opposite angles from opposite ends of the central portion, the first end portion extending between the central portion of the platform and the wall at the first cut-out and the second end portion extending between the central portion of the platform and the wall at the second cut-out.

5. A tire casing spreader comprising the combination of claim 1 wherein the second means for engaging a bead of a tire casing has a lever arm pivotally mounted at one end for rotation about a third pivotal axis disposed in a fixed position tangent and adjacent to the wall, said second arm being rotatable between a first position farther from the central axis than the third pivotal axis and a second position adjacent to the central axis of the wall, the second pivotal axis being mounted on the lever arm parallel to the third pivotal axis and spaced from the third pivotal axis, whereby rotation of the lever arm from the second position to the first position causes the hook of the second arm to be displaced toward the third pivotal axis.

6. A tire casing spreader comprising the combination of claim 5 wherein the second pivotal axis is disposed between the third pivotal axis and the plane of the second end of the wall when the lever arm is in the first position, whereby the force of the tire casing on the lever arm urges the arm from the second pivotal position.

7. A tire casing spreader comprising the combination of claim 1 wherein the base is provided with a second hollow cylindrical wall of the same diameter as the first wall, the second wall having third and fourth ends disposed on spaced planes normal to the central axis of the second wall, the first end of the second wall being adapted to be disposed on a horizontal surface and the first end of the first wall being adapted to rest upon the second end of the second wall, and means associated with the base for securing the first wall on the second wall.

8. A tire casing spreader comprising the combination of claim 7 wherein the first wall has a flange extending from the first end thereof, and the first end of the second wall mates with the flange and is accommodated thereby.

9. A tire casing spreader comprising the combination of claim 7 wherein the annular flange of the first wall extends outwardly therefrom, and the means for securing the first wall on the second wall comprises a plurality of tabs mounted on the inner side if the first wall adjacent to the annular flange, each of said tabs extending toward the first end of the first wall and confronting the annular flange thereof.

10. A tire casing spreader comprising, in combination, a base having a hollow cylindrical wall with a central axis and first and second open ends, the first and second ends being disposed on spaced planes normal to the axis of the wall and the first end being adapted to rest upon a horizontal surface, the wall having first and second cut-outs extending therein from opposite sides of the second end adapted to receive a tire casing, a first plate mounted on and tangent to the wall adjacent to the second end thereof between the first and second cut-outs and extending outwardly therefrom confronting the central axis of the wall, a first arm pivotally mounted at one end on the first plate, said arm being mounted for rotation about a first pivotal axis disposed on and parallel to the first plate and spaced from the second end of the wall, said first arm being rotatable between a first position farther from the central axis than the first pivotal axis and a second position between the central axis and the first pivotal axis, said first arm having a first hook extending outwardly therefrom and downwardly therefrom when the arm is disposed in the second pivotal position, said first hook being adapted to engage one the beads of a tire casing in said second pivotal position, and a second plate mounted on and tangent to the wall adjacent to the second end thereof on the opposite side of the wall from the first plate, a lever arm pivotally mounted on the second plate adjacent to one end thereof for rotation about a third pivotal axis disposed in a fixed position in the plane of the plate and spaced from the second end of the wall, a second arm pivotally mounted at one end on the lever arm for rotation about a second pivotal axis disposed parallel to the third pivotal axis and spaced from the third pivotal axis, said second arm being rotatable between a first position farther from the central axis than the third pivotal axis and a second position adjacent to the central axis of the wall, said second arm having a second hook extending outwardly therefrom and downwardly therefrom when the arm is disposed in the second pivotal position, said second hook being adapted to engage the other bead of a tire casing in said second pivotal position, whereby rotation of the lever arm from the second position to the first position causes the hook of the second arm to be displaced toward the central axis of the wall, and further including a platform having first and second opposite ends, the first end being mounted on the wall adjacent to the first cut-out and the second end being mounted on the wall adjacent to the second cut-out, the cut-outs extending into the wall to a third plane between the planes of the first and second ends and the platform having a central portion adapted to support a tire casing disposed between the third plane and the plane of the first end of the wall.

11. A tire casing spreader comprising the combination of claim 10 wherein the lever arm is provided with a stop against rotation from the first position, and when the lever arm is disposed in the second position the second pivotal axis is between the third pivotal axis and the plane of the second end of the wall, whereby the force of the tire casing on the lever arm urges the arm toward the stop.

* * * * *